Aug. 7, 1956 D. E. GARRETT ET AL 2,758,248

ANTI-PINCUSHION CIRCUIT

Filed Feb. 21, 1955 2 Sheets-Sheet 1

INVENTORS:
DONALD E. GARRETT,
ROBERT F. WOOD,
BY Donald N. Timbie
THEIR ATTORNEY.

INVENTORS:
DONALD E. GARRETT,
ROBERT F. WOOD,
BY Donald N. Timlin
THEIR ATTORNEY.

2,758,248

ANTI-PINCUSHION CIRCUIT

Donald E. Garrett and Robert F. Wood, North Syracuse, N. Y., assignors to General Electric Company, a corporation of New York Application February 21, 1955, Serial No. 489,512

6 Claims. (Cl. 315—27)

This invention relates to improved means for correcting the most troublesome aspects of pincushion distortion in cathode-ray tubes.

As is well known by those skilled in the art, this type of distortion is most noticeable when the image is formed in a flat phosphor screen and that it has the effects of bowing lines that should be horizontal or vertical toward the center of the image and extending the corners. Because of the aspect ratio of present television images (four units of width to one unit of height) the bowing-in of vertical lines is most noticeable.

It is accordingly an object of this invention to prevent or minimize vertical lines in the true televised image from appearing curved or bowed in the image formed by a cathode-ray tube.

This objective may be attained in accordance with the principles of this invention by decreasing the horizontal deflection angle at the top and bottom of the image relative to the horizontal deflection angle at the center of the image. In order to obtain this result, a correction voltage may be applied to a control electrode of the tube that drives the horizontal deflection coils. The correction voltage will have a generally parabolic shape with the peaks occurring at the top and bottom of each field.

The nature of horizontal deflection circuits in general use is such that if the correction required exceeds a certain limit, the peaks of the parabolic type correction voltage will cause an overcorrection so that the horizontal deflection angle for the top and bottom lines of the image is reduced too much relative to the deflection angle for the lines at the center of the image. This causes the corners of the image to "toe in."

It is accordingly another object of this invention to provide a means for applying a parabolic type correction wave to the tube that drives the horizontal deflection in such way as to prevent overcorrection of the sweep width and the consequent "toe in" at the top and bottom of the image.

This latter objective can be attained by providing means for reducing the peaks of the parabolic type of correction wave.

The following methods have been used in an attempt to reduce certain deleterious effects of pincushion distortion; curving the phosphor surface, making the deflection field non-linear or mounting magnets around the edge of the phosphor screen. However, these methods are not all easily applied to most multi-beam cathode-ray tubes adapted to reproduce images in color for the following reasons: It is not desirable in the present state of the art to completely correct by curvature of the phosphor surface; a non-linear deflection field produces different effects on the different electron beams as they are necessarily in different parts of the field; and magnets at the edge of the phosphor screen can cause incorrect colors to be produced.

Accordingly, it is another object of this invention to provide an improved means for minimizing certain deleterious effects of pincushion distortion in multi-beam cathode-ray tubes adapted to reproduce images in color.

The invention will be better understood after the following detailed discussion of the drawings in which.

Figure 1:
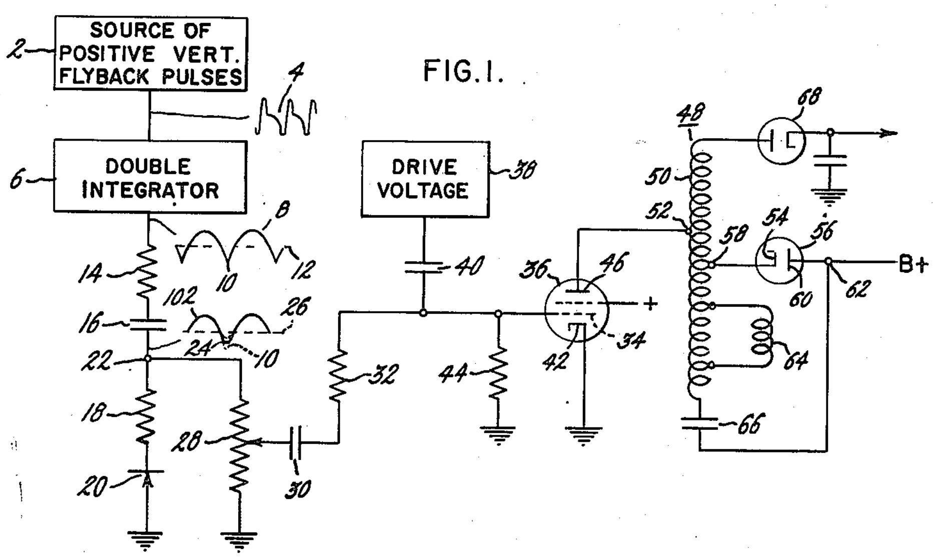
Figures 1, 2 and 3 illustrate various circuits embodying the principles of this invention.

In Figure 1, the numeral 2 indicates a source 2 of positive vertical flyback pulse 4 and may be comprised of a coil magnetically coupled to the vertical deflection coils. A double integrator 6 is coupled to the output of the source 2 and, for reasons well known to those skilled in the art, may be such as to produce a generally parabolic voltage wave 8 having negative peaks 10 that occur at the top and bottom of each field. For purposes of simplicity, the wave 8 will be termed a parabola, but it will be understood that it need not be a true parabola, but merely have similar shape. A series circuit comprised of a resistor 14, a capacitor 16, a resistor 18 and a unilateral current conducting device 20, polarized as indicated, is connected between the output of the double integrator 6 and ground. During portions of the time that the parabola 8 is positive, the device 20 presents its highest impedance and this portion of the parabola 8 appears at the junction 22 without any substantial change. However, when the parabola 8 goes negative with respect to ground at junction 22, the diode 20 conducts and the voltage of this portion of the parabola 8 is reduced by a factor equal to the ratio of the impedance between the junction 22 and ground and the output of the double integrator 6 and ground. Hence, the negative peaks 10 of the parabola 8 are reduced in amplitude so that the wave at the junction 22 appears as indicated by the solid line curve 24. In particular, the time at which the parabola 8 goes negative with respect to ground, hence, that portion of the parabola that is shunted out by the diode can be determined by the R. C. time constant seen between the junction 22 and ground.

A suitable amplitude of the wave 24 may be selected by a potentiometer 28 and coupled via a capacitor 30 and an isolating resistor 32 to a grid 34 of a horizontal drive tube 36. The customary source 38 of horizontal drive voltage is coupled via a capacitor 40 to the grid 34. The cathode 42 of the tube 36 is usually grounded and a grid-leak resistor 44 is connected between the grid 34 and ground.

The plate 46 of the drive tube 36 is connected so as to drive any suitable electromagnetic deflection circuit generally indicated by the numeral 48. In this particular example, the deflection circuit includes an auto-transformer winding 50. The plate 46 is connected to a tap 52. A cathode 54 of a damper diode 56 is connected to a tap 58 and its plate 60 is connected to a point 62 of B+ potential. A horizontal deflection winding 64 is connected in shunt with a portion of the auto-transformer winding 50, and a capacitor 66, known as a "B boost" capacitor, is connected between the lower end of the winding 50 and the point 62 of B+ potential. A high voltage rectifier 68 is connected to the upper end of the winding 50.

Figure 5:
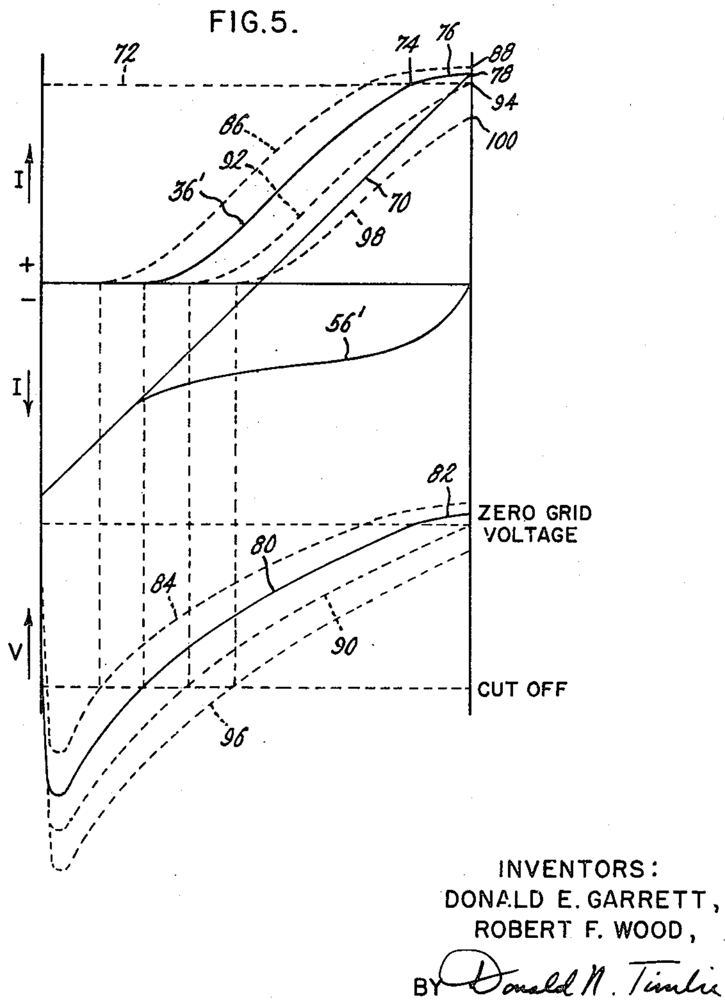

The operation of the circuit of Figure 1 will now be explained with the aid of the graphs of Figure 5 which have an ordinate representing current and an abscissa representing time. The curve 36' represents the current through the driver 36 and the curve 56' represents the current through the damper tube 56. The current flowing through the deflection winding 64 may be obtained by algebraically adding the curves 36′ and 56′, after consideration of the auto-transformer 50 turns ratio, the result being the desired straight line 70. The dotted line 72 indicates the current level at which the driver tube 36 draws grid current, and in this particular example, intersects the curve 36′ at a point 74. After the grid starts drawing current, the rate at which the driver current increases falls off as indicated by the section 76 of the curve 36′. For best operation, it is generally desirable that the grid 34 be biased so as to draw current for a given amount of time such, for example, as indicated by the curve 36′. The maximum current through the driver occurs at the point 78 and determines the maximum width obtained.

The grid voltage wave that produces the currents represented by the curves 36′ and 56′ is indicated by the numeral 80. It will be noted that it passes through the cut-off voltage for the grid 34 at a time when the driver tube current 36′ starts and that it arrives at the zero bias point at the same time as the curve 36′ passes through the point 74. From this point on the grid 34 draws current. Due to grid current conduction 34′ of grid 34, the slope of the grid voltage 80 decreases in slope as shown by curve 82. There is a corresponding decrease of the slope of curve 36′ as shown by the portion 76 of curve 36′.

Now assume that the bias applied to the grid 34 is decreased so that the grid drive voltage wave is moved upward to the position indicated by the dotted line 84. The changes in the current flowing through the damper 56 are not shown in order that the graph not become more complicated than necessary, but if drawn, they would be of such shape as to produce a resultant current that is a straight line. However, the current of the driver tube is indicated by a curve 86 and has a maximum value at 88. The change in the width of scan is indicated by the current difference between points 78 and 88. Now assume that the bias is increased so that the grid drive voltage may be represented by the curve 90 which just reaches zero grid voltage at its peak. No current is drawn by the grid 34 so that the current flowing through the driver tube 36 is as indicated by the curve 92. The curve is not flattened off near its peak and has a maximum at a point 94 at the level of the dotted line 72. The reduction in width of scan is proportional to the current difference between the points 94 and 78 and is about the same as before, as the difference between these points is about the same as the difference between the points 78 and 88.

Now, however, assume that the bias on the grid 34 is such that the grid drive voltage is as indicated by the curve 96, the peak of which does not reach zero grid voltage. The corresponding current in the driver tube 36 is as indicated by the curve 98 and has a peak occurring at the point 100. It will be noted that the slope at the peak of this curve is not flattened with respect to the peak of the grid voltage curve 96 so that the change in width represented by the current difference between the points 94 and 100 is greater than before. The various grid voltage curves 84, 80, 90 and 96 are separated by equal amounts of grid bias voltage, but the corresponding changes in maximum driver current are different. In particular, the change in the maximum current of the driver tube 36 between the point 78 and either 88 or 94 is much less than between the points 94 and 100. Hence, the change in the current of the driver tube 36, as a result of a change in bias on the grid 34, is less under bias conditions such that the grid 34 draws current than it is under conditions when the grid 34 does not draw current.

The amplitude of the correction wave 24 is such that the normal bias voltage on the grid 34 would occur at an intermediate point such as 102. When the correction wave 24 goes positive with respect to this point, the grid drive voltage wave is moved in a positive direction, as indicated by the curve 84 of Figure 5, and the current through the driver tube 36 is as represented by the curve 86 of Figure 5 so that the width of scan is increased. For values of the correction wave 24 below the point 102, the bias on the grid 34 is increased so that the grid drive curves drop down as indicated by the curve 90 and a current, such as indicated by curve 92, flows in the driver tube 36. If the parabola 8 were not modified by the action of the diode 20 so that the negative peaks 10 appeared as indicated by the lower dotted line of the curve 24, the grid drive wave would be driven down so far that the width of the top and bottom lines of the image would be reduced too much. However, the action of the diode 20 and the resistor 18 prevents the negative peaks 10 of the correction wave from reducing the width too much. If the resistance of the resistor 18 were too small, the negative peaks 10 of the correction wave 24 would be reduced as indicated by the upper dotted line and insufficient reduction in the width of the lines at the top and bottom of the raster would result. A proper value of the resistor 18 produces the solid line of curve 24 and thus is just sufficient to pull the corners in the correct amount.

Figure 4:
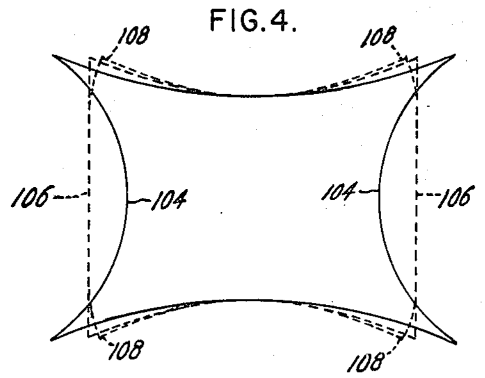
Figure 4 illustrates the shapes of the image on the face of the cathode-ray tube under varying conditions, and Figure 5 contains a number of graphs useful in explaining the operation of Figures 1, 2 and 3.

Figure 4 indicates the outlines of the image under different conditions. The solid line 104 represents the outline when no correction is applied. If the resistor 18 is too large, the corners are pulled-in somewhat and the right and left hand edges may become straighter. If the value of the resistor 18 is correct, the image has true rectangular form as indicated by the dash-dot line 106. However, if the resistor 18 is too small, the width of the lines at the top and bottom is reduced too much with the result that the corners of the image are toed-in as indicated by the dotted lines 108. In this last condition, the left and right edges may be nearly straight.

Figure 2:
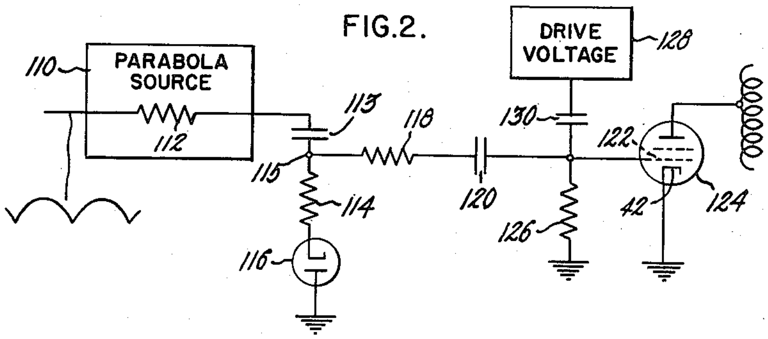

Figure 2 illustrates an embodiment of the invention wherein a source 110 of generally parabolic waves is assumed to have an effective internal impedance represented in this particular case by a resistor 112. A capacitor 113, which may be part of the source 110, is coupled at a junction 115 to a series circuit formed by a resistor 114 and a diode 116. An isolating resistor 118 and a blocking capacitor 120 are connected between the junction 115 and a control grid 122 of a driver tube 124. A grid-leak resistor 126 is connected between the grid 122 and ground and a source 128 of drive voltage is coupled to the grid 122 by a capacitor 130. It will be recognized that this is a shunt-feed arrangement. The internal impedance 112 corresponds in function to the resistor 14 of Figure 1 and the capacitor 113 corresponds in function to the capacitor 16 of Figure 1. The isolating resistor 118 of Figure 2 and the isolating resistor 32 of Figure 1 prevent undue loading of the sources 128 and 38 respectively, but may be eliminated in some designs. The capacitors 120 and 30 of Figures 2 and 1 respectively prevent the bias voltage at the grid of the respective driver tubes from leaking off to ground through the diodes.

Figure 3:
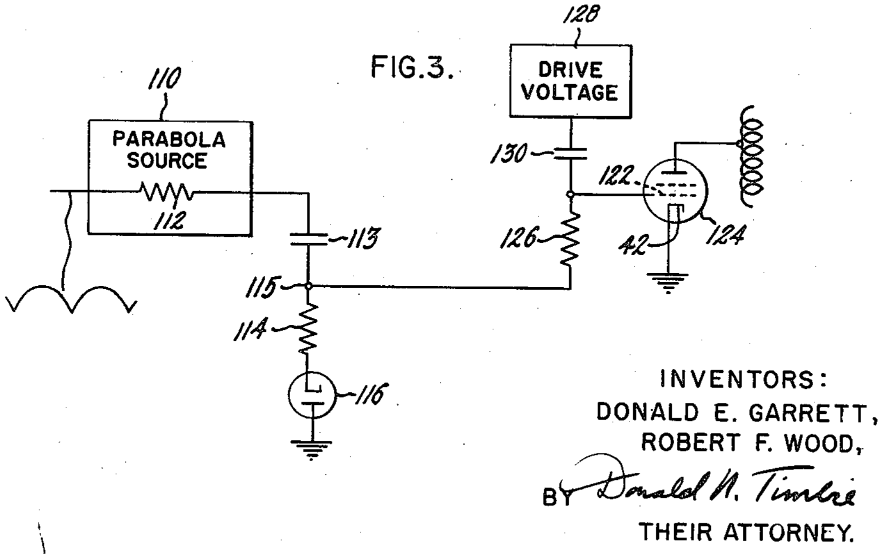

Figure 3 represents an embodiment of the invention wherein series-feed is used. Components corresponding to Figure 2 are indicated by the same numerals. However, for reasons well known to those skilled in the art, an isolating resistor and a blocking capacitor are not required between the junction 115 and the grid 122 of the driver tube 124.

While we have illustrated a particular embodiment of my invention, it will of course be understood that we do not wish to be limited thereto, since various modifications both in the circuit arrangement and in the instrumentalities may be made, and we contemplate by the appended claims to cover any such modifications as fall within the true spirit and scope of the invention.

What we claim as new and desire to secure by Letters Patent of the United States is:

1. A circuit for straightening the vertical lines in televised images that would otherwise be bent toward the center of the images comprising, in combination, a source of correction voltage waves of field scanning frequency, the waves having a generally parabolic shape with peaks occurring at the top and bottom of each field, a horizontal driver tube having control electrodes, an electromagnetic deflection circuit coupled to the output of said driver tube, circuits for coupling said source of parabolic waves to a control electrode of said driver tube, a source of waves suitable for controlling the current flowing through said driver tube and circuits for coupling said latter source to a control electrode of said driver tube.

2. A circuit as set forth in claim 1 wherein the circuit for coupling said source of parabolic waves to a control electrode of said driver tube includes means for reducing the amplitude of the peaks of said parabolic wave.

3. A circuit as defined in claim 1 wherein the circuit for coupling said source of parabolic waves to a control electrode of said driver tube includes a series circuit comprised of a resistance, a capacitor, a resistor and a unilateral current conducting device connected in series between said source of parabolic waves and ground and a connection for applying the voltage appearing across said resistor and said unilateral current conducting device to a control electrode of said driver tube.

4. In an image reproducing system having pincushion distortion and where the image is formed by a beam or beams of electrons that are deflected by an electromagnetic deflection system, a distortion correction circuit comprising, in combination, a source of waves having generally parabolic shape, said source having a predetermined amount of internal impedance, a driver tube having control electrodes and an output electrode, circuits for coupling said output electrode to said deflection system, a source of deflection drive voltage waves, circuits for coupling said latter source to a control electrode of said driver tube, a capacitor, an impedance having a given resistive component and a unilateral current conducting device connected in series between the output of said source of parabolic waves and ground, and means for coupling the modified parabolic wave appearing across said impedance and said unilateral current conducting device to a control electrode of said driver tube.

5. A distortion correction circuit as set forth in claim 4 wherein the means for coupling is of the shunt-feed type.

6. A distortion correction circuit as set forth in claim 4 wherein the means for coupling is of the series-feed type.

References Cited in the file of this patent

UNITED STATES PATENTS

| | | |
|---|---|---|
| 2,309,672 | Schade | Feb. 2, 1943 |
| 2,659,837 | Murdock | Nov. 17, 1953 |
| 2,664,521 | Schlesinger | Dec. 29, 1953 |
| 2,672,505 | Schwarz | Mar. 16, 1954 |